UNITED STATES PATENT OFFICE.

ANTON LEDERER, OF ATZGERSDORF, NEAR VIENNA, AUSTRIA-HUNGARY.

MANUFACTURE OF GLOWING BODIES OF REFRACTORY METALS FOR ELECTRIC LAMPS.

No. 908,682.      Specification of Letters Patent.      Patented Jan. 5, 1909.

Application filed April 3, 1906. Serial No. 309,715.

*To all whom it may concern:*

Be it known that I, ANTON LEDERER, a subject of the Empire of Austria-Hungary, residing at No. 83, Atzgersdorf, near Vienna, in the Province of Lower Austria and Empire of Austria-Hungary, have invented new and useful Improvements in the Manufacture of Glowing Bodies of Refractory Metals for Electric Lamps, of which the following is a specification.

My invention relates to improvements in the manufacture of incandescence bodies of refractory metals for electric lamps, and its object is to expedite the reaction of the materials used and by these means to make the process of manufacture of such incandescence bodies a rapid one.

In the manufacture of metallic incandescence bodies for electric lamps, use is made in most cases of the oxid of the metal to be employed as the material of the body, this oxid being reduced to metal during the process. In order to facilitate the operation of forming these incandescence bodies, I proceed as follows: Assuming that the bodies are to be made of a paste consisting of a metallic oxid mixed with carbon,—for example, tungsten dioxid or tungsten trioxid and carbon, then, according to my invention, I add to this paste a small quantity of aluminium or magnesium in a metallic state. The bodies, which may be in the form of filaments, studs or rods, are then shaped in the usual way and caused to glow by passing electric current through them. In carrying out the described process, reduction of the metallic oxid to metal is effected in a much shorter time than by the older processes, lacking the aluminium or magnesium addition.

It has been proved by Moissan that the oxids of aluminium or magnesium formed in the process described are volatile at high temperature, and it follows that when the bodies are exposed to the heat of incandescence, as usually required, the added substances, namely aluminium or magnesium, will be volatilized, after having been converted into their oxids in the process of treatment.

I have found that the best results are obtained if about .1 to about .5 per cent. of finely divided aluminium or magnesium are added to the paste and the mixture then formed into incandescence bodies.

It is obvious that incandescence bodies may be manufactured in the same manner from alloys of refractory metals.

I claim as my invention:—

1. The process of manufacturing metallic incandescence bodies for incandescent electric lamps, which consists in mixing an oxid of a metal, carbon and an auxiliary metal which facilitates the reduction of the metallic oxid to metal, forming incandescence bodies from such mixture, reducing the metallic oxid to the metallic state by means of an electric current passed therethrough, and volatilizing the oxid of the auxiliary metal formed in the reaction by means of the electric current.

2. The process of manufacturing metallic incandescence bodies for incandescent electric lamps, which consists in forming a paste containing the oxid of a metal, carbon and aluminum, shaping the incandescence bodies from such paste, reducing the oxid of the metal to a metallic state by transmitting electric current therethrough, and volatilizing the alumina formed in the reaction by means of the electric current.

3. The process of manufacturing incandescence bodies for incandescent lamps, which consists in mixing with an oxid of tungsten and carbon a small percentage of a metal which facilitates the reduction of the tungsten oxid to metal, forming the incandescence bodies from the mixture and reducing the same to a relatively pure tungsten by the transmission of an electric current therethrough.

4. The process of manufacturing metallic incandescence bodies, which consists of forming a paste containing the metal of which the incandescence bodies is to consist in the form of an oxid with the addition of from one to five-tenths of 1% of finely divided metallic aluminum, forming the paste into the required shape and reducing by means of an electric current.

In testimony whereof I have signed my name to this specification in the presence of two subscribing witnesses.

ANTON LEDERER.

Witnesses:
     JOHANN LUX,
     ALVESTO S. HOGUE.